(12) United States Patent
Howarth et al.

(10) Patent No.: US 8,095,712 B2
(45) Date of Patent: Jan. 10, 2012

(54) APPARATUS AND METHOD TO READ INFORMATION FROM AN INFORMATION STORAGE MEDIUM

(75) Inventors: James J. Howarth, Tucson, AZ (US); Robert A. Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/862,650

(22) Filed: Aug. 24, 2010

(65) Prior Publication Data
US 2010/0318868 A1 Dec. 16, 2010

Related U.S. Application Data

(62) Division of application No. 10/306,300, filed on Nov. 27, 2002, now Pat. No. 7,793,020.

(51) Int. Cl.
*G06F 13/28* (2006.01)

(52) U.S. Cl. .................. 710/74; 710/62; 710/69; 360/1; 360/8; 360/25; 360/39; 360/55

(58) Field of Classification Search ........................ None
See application file for complete search history.

(56) References Cited

U.S. PATENT DOCUMENTS

| | | | |
|---|---|---|---|
| 4,668,900 A * | 5/1987 | Tabuchi | 318/608 |
| 5,588,011 A | 12/1996 | Riggle | |
| 5,708,597 A | 1/1998 | Kelem | |
| 6,023,421 A | 2/2000 | Clinton et al. | |
| 6,043,946 A * | 3/2000 | Genheimer et al. | 360/53 |
| 6,084,447 A | 7/2000 | Graf, III | |
| 6,112,298 A | 8/2000 | Deao et al. | |
| 6,130,854 A | 10/2000 | Gould et al. | |
| 6,246,733 B1 | 6/2001 | Hutchins | |
| 6,381,725 B1 * | 4/2002 | Isokawa | 714/769 |
| 6,775,084 B1 * | 8/2004 | Ozdemir et al. | 360/55 |
| 6,791,777 B2 | 9/2004 | Watanabe et al. | |
| 2003/0048562 A1 * | 3/2003 | Heydari et al. | 360/51 |
| 2003/0237024 A1 * | 12/2003 | Ogawa et al. | 714/29 |

* cited by examiner

*Primary Examiner* — Eron J Sorrell
(74) *Attorney, Agent, or Firm* — Dale F. Regelman; Quarles & Brady LLP

(57) ABSTRACT

A method and apparatus to read information from an information storage medium using a read channel, where that read channel includes a data cache. The invention generates an analog waveform comprising the information, and provides that analog waveform to a read channel, and generates a digital signal from that analog waveform using one or more first operating parameters. The method error corrects that digital signal at an actual error correction rate, and determines if the actual error correction rate is greater than an error correction rate threshold. If the actual error correction rate exceeds the error correction rate threshold, then the method captures the digital signal, stores that captured data in a data cache, reads that digital signal from the cache, generates one or more second operating parameters, and provides those one or more second operating parameters to the read channel. Thereafter, the method uses those one or more second operating parameters to read the information from the information storage medium.

18 Claims, 11 Drawing Sheets

FIG. 2

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR |
| SERVO | LS1 | RS1 |
| SERVO | LS2 | RS2 |
| 9 | WR | RD |
| 10 | RD | WR |
| 11 | WR | RD |
| 12 | RD | WR |
| 13 | WR | RD |
| 14 | RD | WR |
| 15 | WR | RD |
| 16 | RD | WR |
| SERVO | LS3 | RS3 |
| SERVO | LS4 | RS4 |
| 17 | WR | RD |
| 18 | RD | WR |
| 19 | WR | RD |
| 20 | RD | WR |
| 21 | WR | RD |
| 22 | RD | WR |
| 23 | WR | RD |
| 24 | RD | WR |
| SERVO | LS5 | RS5 |
| SERVO | LS6 | RS6 |
| 25 | WR | RD |
| 26 | RD | WR |
| 27 | WR | RD |
| 28 | RD | WR |
| 29 | WR | RD |
| 30 | RD | WR |
| 31 | WR | RD |
| 32 | RD | WR |

201, 211, 221, 231, 241, 251, 261

200

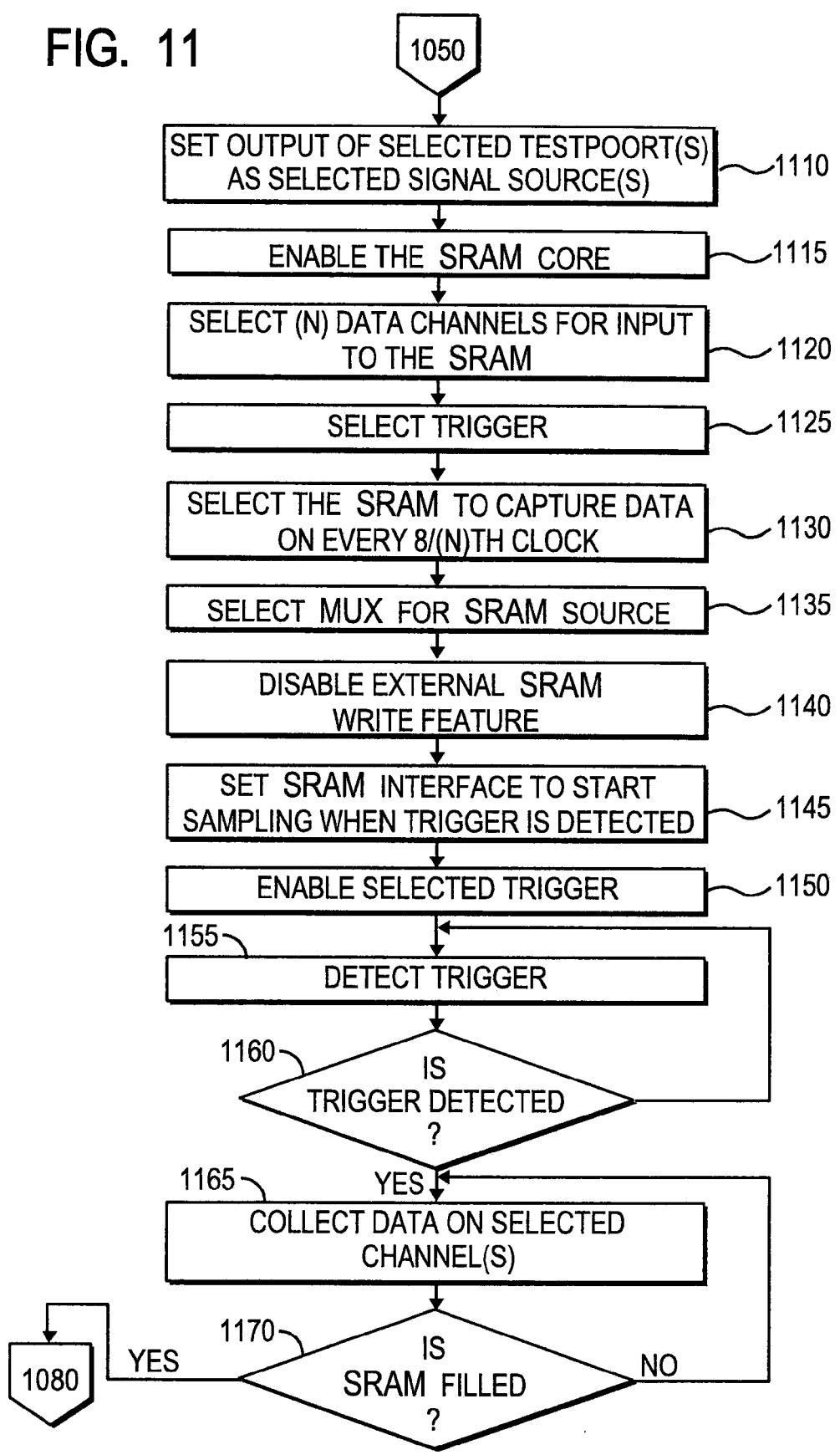

APPARATUS AND METHOD TO READ INFORMATION FROM AN INFORMATION STORAGE MEDIUM

CROSS-REFERENCE TO RELATED APPLICATIONS

This Application is a Divisional Application claiming priority to a U.S. Non-Provisional application having Ser. No. 10/306,300, filed Nov. 27, 2002.

FIELD OF THE INVENTION

Applicants' invention relates to an apparatus and method to read information from an information storage medium. Applicants' invention further relates to a method to adjust in real time the operation of one or more components in a data read channel.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, electronic storage media, and the like. By "electronic storage media," Applicants mean a device such as a PROM, EPROM, EEPROM, Flash PROM, compactflash, smartmedia, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

Removeable media, whether magnetic, optical, or electronic, are subject to variability. Such variability includes, for example, inconsistencies between manufacturers of that media. In addition certain magnetic/optical media comprise encoded information using pulse position modulation. Other magnetic/optical media, comprise encoded information using pulse width modulation. Some media comprise information encoded using both pulse position modulation and pulse width modulation. In addition, such variability arises from modernization of the media.

In order to minimize the deleterious effects of such media variability, what is needed is an apparatus and method to read information from an information storage medium, where that method dynamically adjusts the operating parameters of one or more components of the read channel in real time, i.e. as the medium is being read.

SUMMARY OF THE INVENTION

Applicants' invention comprises a method and apparatus to read information from an information storage medium using a read channel, where that read channel includes a data cache. Applicants' method reads an information storage medium over a time interval and generates over that time interval an analog waveform comprising the information encoded in the storage medium, and provides throughout the time interval that analog waveform to Applicants' read channel. The read channel is in communication with a controller comprising one or more first operating parameters for the read channel. During a first portion of the time interval, Applicants' method generates a digital signal from the analog waveform using those one or more first operating parameters.

Applicants' method sets an error correction rate threshold. While forming the digital signal using the first one or more operating parameters, Applicants' method error corrects that digital signal at an actual error correction rate, and during that first portion of the time interval determines if the actual error correction rate is greater than the error correction rate threshold. If the actual error correction rate is not greater than the error correction rate threshold, then Applicants' method continues to generate the digital signal throughout the time interval using the one or more first operating parameters.

Alternatively, if the actual numbers of errors is greater than the error correction threshold, then Applicants' method, during the first portion of the time interval captures the digital signal, stores that captured data in the data cache, reads that data from the cache, using that captured data generates one or more second operating parameters, provides those one or more second operating parameters to the read channel. Thereafter, Applicants' method generates the digital signal from the analog waveform using the one or more second operating parameters.

BRIEF DESCRIPTION OF THE DRAWINGS

The invention will be better understood from a reading of the following detailed description taken in conjunction with the drawings in which like reference designators are used to designate like elements, and in which:

FIG. 2 is a diagram of the track layout of a tape head;

FIG. 11 is a flowchart summarizing the steps of Applicants' method to capture data from (N) testports.

DETAILED DESCRIPTION OF THE PREFERRED EMBODIMENTS

Referring to the illustrations, like numerals correspond to like parts depicted in the figures. The invention will be described as embodied in a read channel assembly disposed in a tape drive unit. The following description of Applicants' apparatus and method is not meant, however, to limit Applicants' invention to either reading information from a magnetic tape, or to data processing applications, as the invention herein can be applied to reading information from an information storage medium in general.

Figure 3:
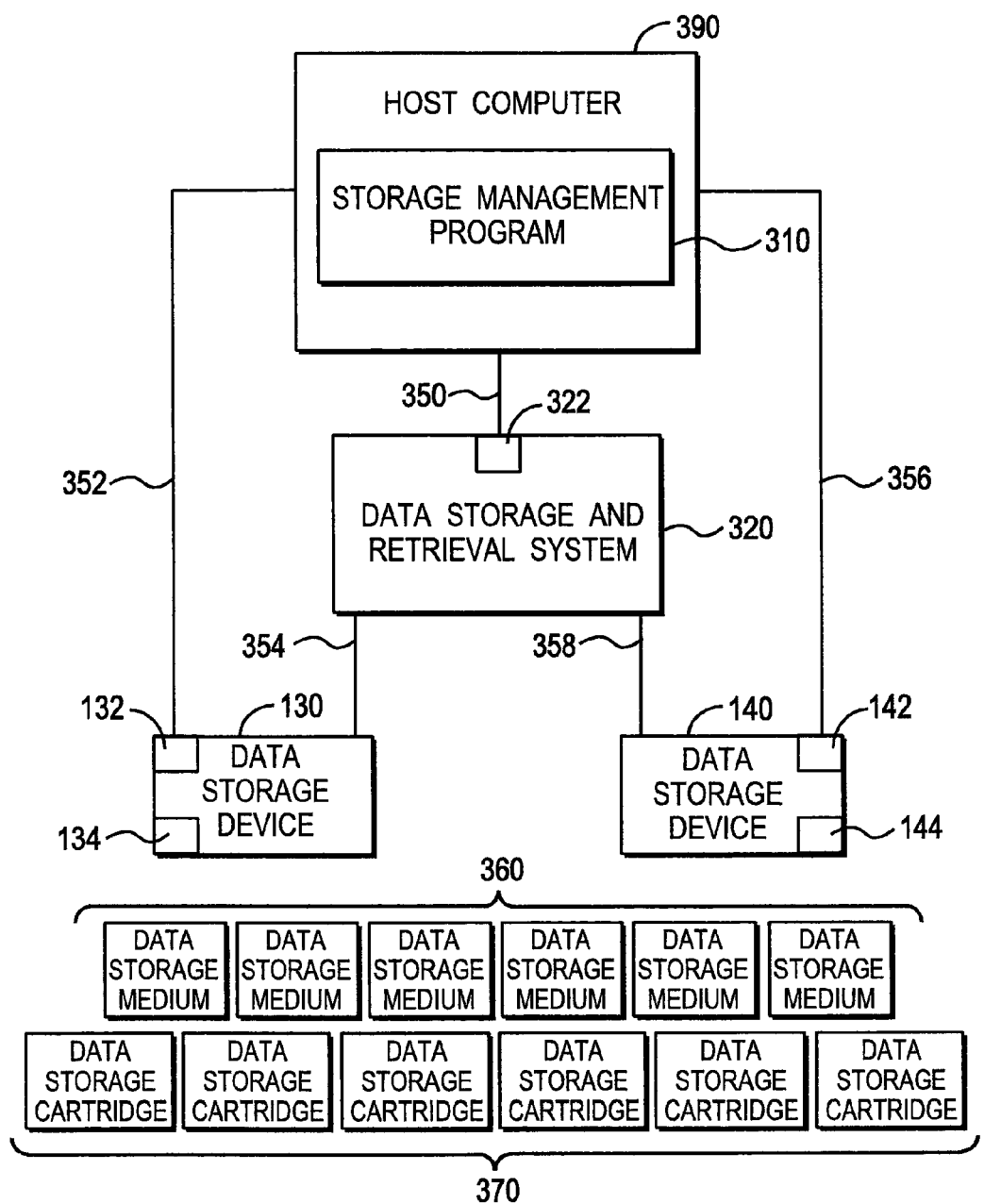
FIG. 3 is a block diagram showing the components of one embodiment of Applicants' data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host computer 390 and secondary storage devices managed by a data storage and retrieval system, such as data storage and retrieval system 320, via communication links 350, 352, and 356. Communication links 350, 352, and 356, comprise a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes data storage devices 130 and 140. In alternative embodiments, Applicants' data storage and retrieval system 320 includes more than two data storage devices.

A plurality of portable data storage media 360 are moveably disposed within Applicants' data storage and retrieval system. In certain embodiments, the plurality of data storage media 360 are housed in a plurality of portable data storage cartridges 370. Each of such portable data storage cartridges may be removeably disposed in an appropriate data storage device.

Data storage and retrieval system 320 further includes program logic to manage data storage devices 130 and 140, and plurality of portable data storage cartridges 370. In alternative embodiments, data storage and retrieval system 320 and host computer 390 may be collocated on a single apparatus. In this case, host computer 390 may be connected to another host computer to, for example, translate one set of library commands or protocols to another set of commands/protocols, or to convert library commands from one communication interface to another, or for security, or for other reasons.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host computer 390 may include the functionality of storage management type programs known in the art that manage the transfer of data to a data storage and retrieval system, such as the IBM DFSMS implemented in the IBM MVS operating system.

The data storage and retrieval system 320 comprises a computer system, and manages, for example, a plurality of tape drives and tape cartridges. In such tape drive embodiments, tape drives 130 and 140 may be any suitable tape drives known in the art, e.g., the TotalStorage™ 3590 tape drives (TotalStorage is a trademark of IBM Corporation). Similarly, tape cartridges 370 may be any suitable tape cartridge device known in the art, such as ECCST, Magstar, TotalStorage™ 3420, 3480, 3490E, 3580, 3590 tape cartridges, etc.

Figure 1:
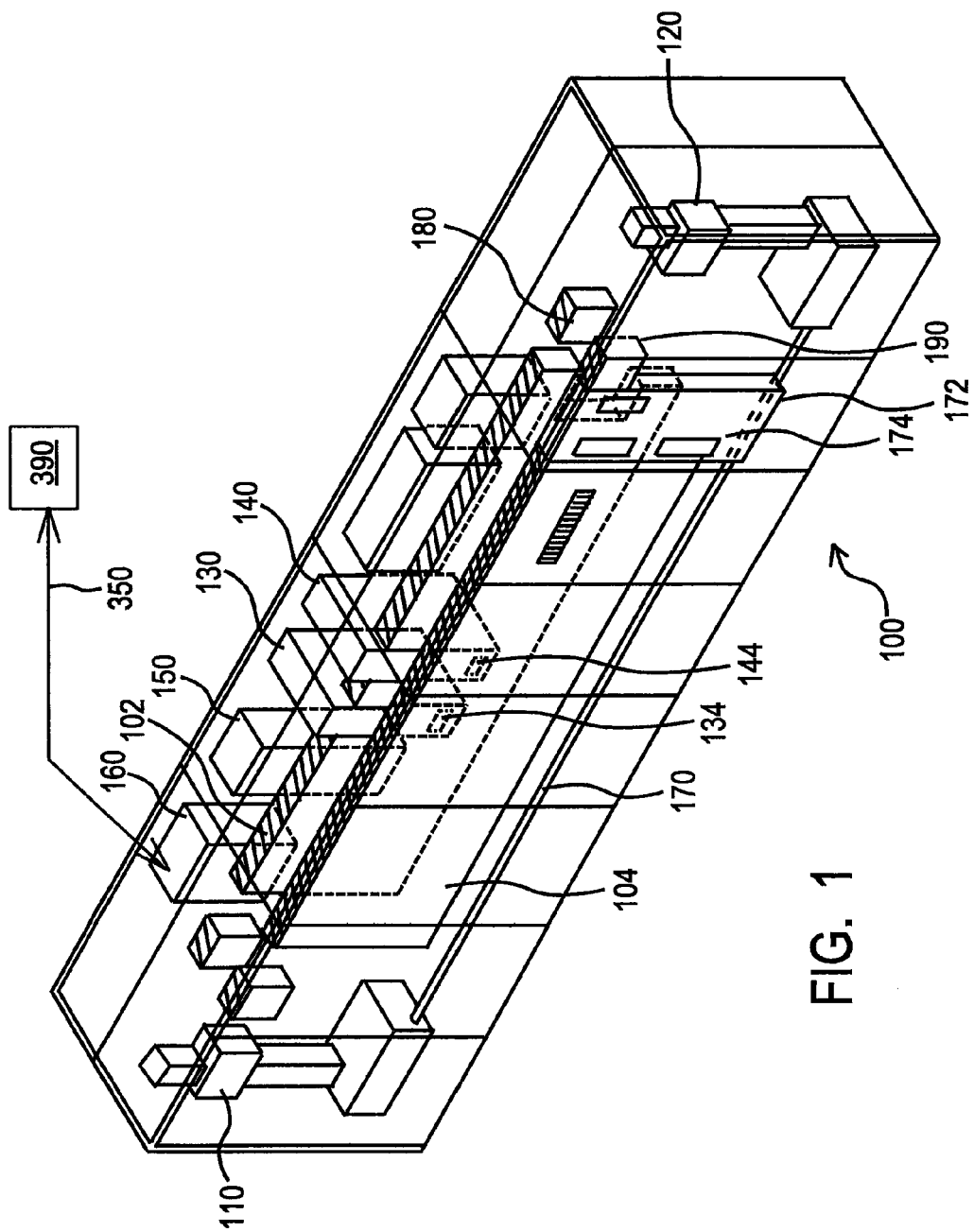
FIG. 1 is a perspective view of a one embodiment of Applicants' data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicants' automated data storage and retrieval system includes one or more accessors, such as accessors 110 and 120. As shown in FIG. 1, accessors 110 and 120 travel bi-directionally along rail 170 in an aisle disposed between first wall of storage slots 102 and second wall of storage slots 104. An accessor is a robotic device which accesses portable data storage media from first storage wall 102 or second storage wall 104, transports that accessed media to data storage devices 130/140 for reading and/or writing data thereon, and returns the media to a proper storage slot. Data storage device 130 includes data storage device controller 134. Data storage device 140 includes data storage device controller 144.

Device 160 comprises a library controller. In certain embodiments, library controller 160 is integral with a computer. Operator input station 150 permits a user to communicate with Applicants' automated data storage and retrieval system 100. Power component 180 and power component 190 each comprise one or more power supply units which supply power to the individual components disposed within Applicants' automated data storage and retrieval system. Import/export station 172 includes access door 174 pivotably attached to the side of system 100. Portable data storage cartridges can be placed in the system, or in the alternative, removed from the system, via station 172/access door 174.

In the embodiments wherein data storage drive 130 and/or 140 comprises a tape drive unit, that tape drive unit includes, inter alia, a tape head. Referring now to FIG. 2, multi-element tape head 200 includes a plurality of read/write elements to record and read information onto and from a magnetic tape. In certain embodiments, magnetic tape head 200 comprises a thin-film magneto-resistive transducer. In an illustrative embodiment, tape head 200 may be constructed as shown in FIG. 2. The length of the tape head 200 substantially corresponds to the width of a magnetic tape. In certain embodiments tape head 200 includes thirty-two read/write element pairs (labeled "RD" and "WR") and three sets of servo read elements, LS1 and RS6 for example, corresponding to the three servo areas written to the magnetic tape. In the illustrated embodiment, the thirty-two read/write element pairs are divided into groups of eight, i.e. groups 201, 221, 241, and 261.

Tape head 200 further includes a plurality of servo sensors to detect servo signals comprising prerecorded linear servo edges on the magnetic tape. In the embodiment of FIG. 2, adjacent groups of 8 read/write pairs are separated by two tracks occupied by a group of four servo sensors. Each group of four servo sensors may be referred to as a "servo group", e.g. servo group 211, servo group 231, and servo group 251.

In the illustrated embodiment, tape head 200 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

Figure 4:
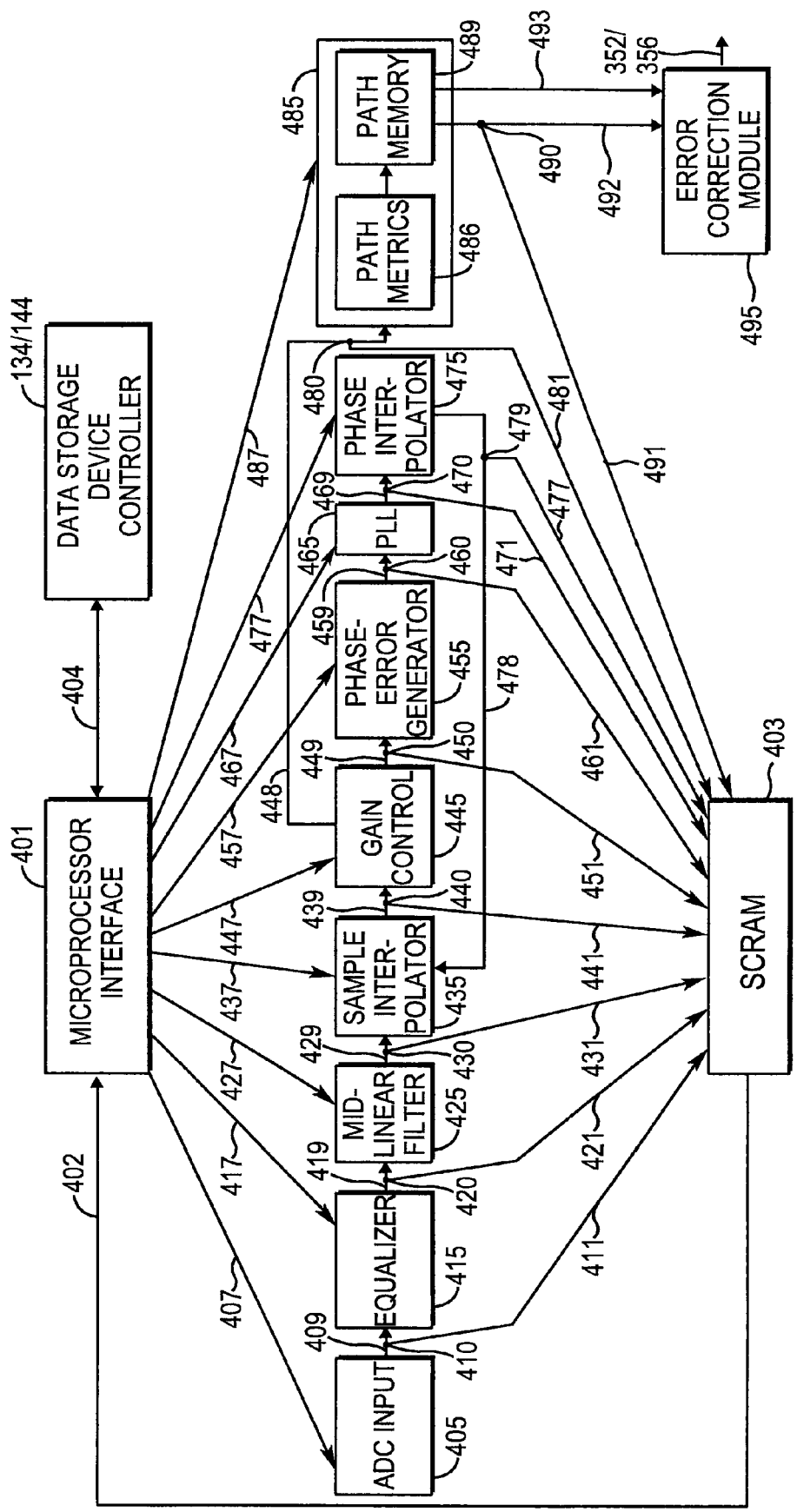
FIG. 4 is a block diagram showing the components of Applicants' read channel assembly.

FIG. 4 shows the components of one embodiment of Applicants' asynchronous read channel assembly. In the illustrated embodiment of FIG. 4, Applicants' asynchronous read channel assembly includes microprocessor interface 401, data cache 403, communication link 402 interconnecting microprocessor interface 401 and cache 403. In certain embodiments, data cache 403 comprises one or more SRAM devices. In certain embodiments, data cache 403 comprises about 4 kilobytes of storage. In certain embodiments, data cache 403 comprises more than about 4 kilobytes of storage.

Applicants' read channel further includes analog to digital converter 405, equalizer 415, mid-linear filter 425, sample interpolator 435, gain control module 445, phase error generator 455, PLL circuit 465, phase interpolator 475, path metrics module 486, and path memory 489. Path metrics module 486 in combination with path memory 489 comprises what is sometimes referred to as a maximum likelihood detector 485. In certain embodiments, Applicants' read channel includes an PR4 maximum likelihood detector. In certain embodiments, Applicants' read channel includes an EPR4 maximum likelihood detector.

In certain embodiments, Applicants' apparatus includes a single read channel. In certain embodiments, Applicants' apparatus includes a plurality of read channels. In certain embodiments, Applicants' apparatus includes 8 read channels. In certain embodiments, Applicants' apparatus includes 8 read channels in combination with 2 servo channels.

When reading information from a magnetic tape using a read head, such as read/write head 200, an analog waveform comprising that information is first formed. An analog to digital converter, such as ADC 405 converts the analog waveform to a first digital signal. That first digital signal is provided to equalizer 415 using communication link 409. Communication link 409 includes testport 410. In certain embodiments, equalizer 415 comprises a finite impulse response ("FIR") filter. Such a FIR filter shapes the first digital signal to produce a second digital signal.

Communication link 411 interconnects testport 410 and data cache 403. In certain embodiments, communication link 411 includes one or more communication links interconnecting testport 410 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

The second digital signal formed in equalizer 415 is provided to mid-linear filter 425 using communication link 419. Communication link 419 includes testport 420. Mid-linear filter 425 determines the value of the equalized signal at the middle of the sample cell. Mid-linear filter 425 produces a third digital signal which includes the equalized signal and the value of the equalized signal at the middle of the sample cell.

Communication link 421 interconnects testport 420 and data cache 403. In certain embodiments, communication link 421 includes one or more communication links interconnecting testport 420 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

The third digital signal formed in mid-linear filter 425 is provided to sample interpolator 435 via communication link 429. Communication link 429 includes testport 430. Sample interpolator 435 receives the third digital signal from mid-linear filter 425 and using the output of PLL circuit 465 estimates the equalized signal at the synchronous sample time. By synchronous sample time, Applicants mean the time when the bit cell clock arrives. PLL circuit 465 provides this time. Sample interpolator 435 provides a fourth synchronous digital signal.

Communication link 431 interconnects testport 430 and data cache 403. In certain embodiments, communication link 431 includes one or more communication links interconnecting testport 430 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

The fourth digital signal formed by sample interpolator 435 is provided to gain control module 445 via communication link 439. Communication link 439 includes testport 440. Gain control module 445 adjusts the amplitude of the fourth signal to form a fifth digital signal having an amplitude set to preset levels required by the maximum likelihood detector 485. The fifth digital signal is provided to maximum likelihood detector 485 via communication link 448. Communication link 448 includes testport 480. Communication link 481 interconnects testport 480 and data cache 403. The output of the maximum likelihood detector is data on communication link 492 and a data valid signal on communication link 493.

Communication link 481 interconnects testport 480 and data cache 403. In certain embodiments, communication link 481 includes one or more communication links interconnecting testport 480 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

The fifth digital signal formed by gain control module 445 is also provided to phase error generator 455 via communication link 449. Communication link 449 includes testport 450. Phase error generator 455 estimates the phase of the fifth digital signal and generates an error signal.

Communication link 451 interconnects testport 450 and data cache 403. In certain embodiments, communication link 451 includes one or more communication links interconnecting testport 450 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

Phase error generator 455 provides a phase error signal to PLL circuit 465 via communication link 459. Communication link 459 includes testport 460. Communication link 461 interconnects testport 460 and data cache 403. In certain embodiments, communication link 461 includes one or more communication links interconnecting testport 460 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

The phase error provided by phase error generator 455 is processed by PLL circuit 465 which filters that phase error and determines the locations of the synchronous bit cell boundaries. The locations of the synchronous bit cell boundaries are provided to phase interpolator 475 and sample interpolator 435 via communication links 469 and 478, respectively. Communication link 469 includes testport 470. Communication link 478 includes testport 479.

Communication link 471 interconnects testport 470 and data cache 403. In certain embodiments, communication link 471 includes one or more communication links interconnecting testport 470 and one or more data ports, one or more communication links interconnecting the one or more data ports with one or more multiplexers, one or more communication links interconnecting the one or more multiplexers with one or more demultiplexers, and one or more communication links interconnecting the one or more demultiplexers with data cache 403.

Figure 5:
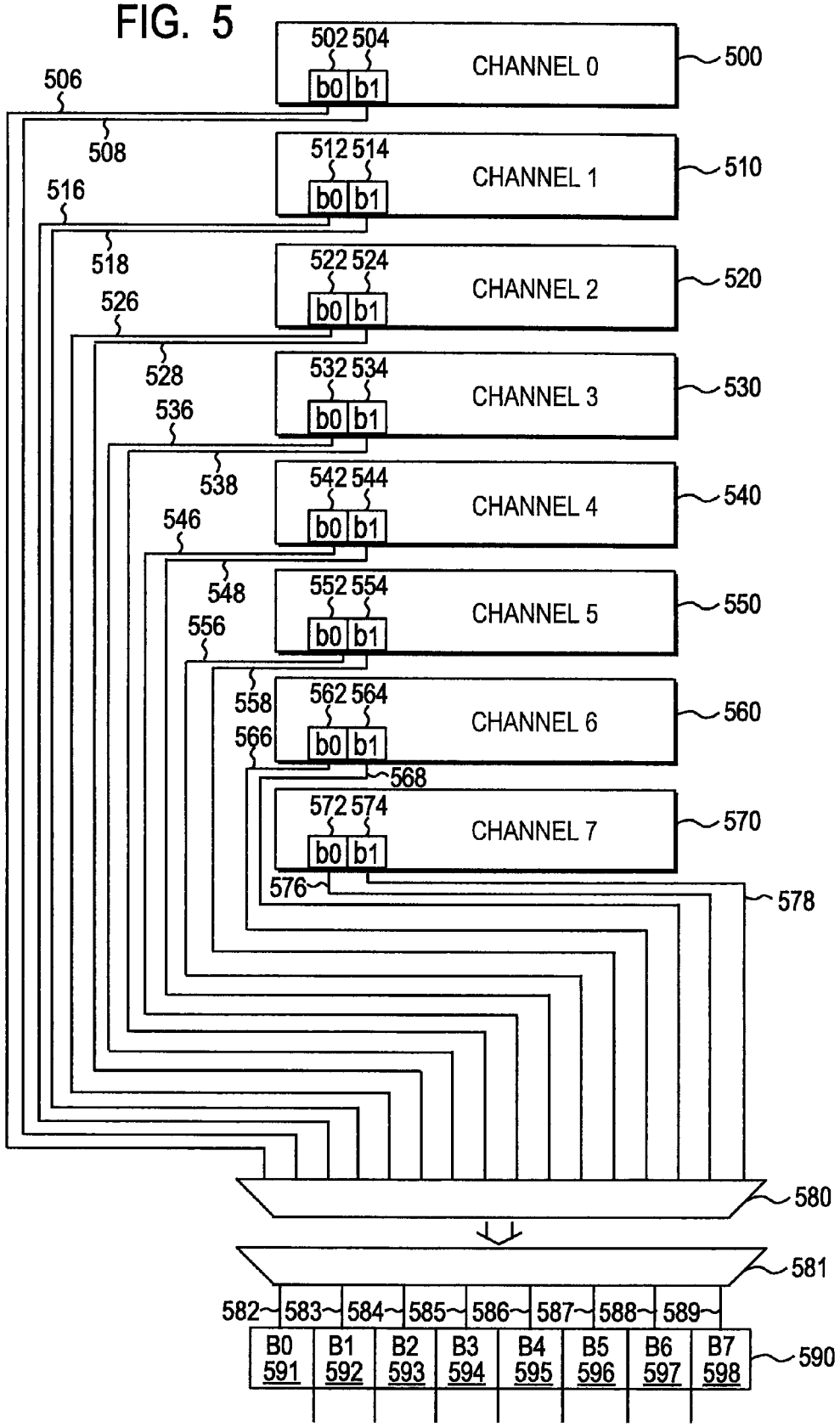
FIG. 5 is a block diagram showing the communication links interconnecting a plurality of read channels and an data cache.

FIG. 5 shows the interconnections between 8 read channels, i.e. channels 0, 1, 2, 3, 4, 5, 6, and 7, and data cache 403. In certain embodiments, SRAM device 590 comprises data cache 403. Each of channels 0, 1, 2, 3, 4, 5, 6, and 7, includes an equalizer 415, a mid-linear filter 425, a sample interpolator 435, a gain control module 445, a phase error generator 455, a PLL circuit 465, a phase interpolator 475, and a maximum likelihood detector 485. Each of channels 0, 1, 2, 3, 4, 5, 6, and 7, further includes communication links 407, 409, 417, 419, 427, 429, 437, 439, 447, 448, 449, 457, 459, 467, 469, 477, 487, 492, and 493. Each of channels 0, 1, 2, 3, 4, 5, 6, and 7, further includes testports 410, 420, 430, 440, 450, 460, 470, 479, 480, and 490.

Each of channels 0, 1, 2, 3, 4, 5, 6, and 7, further includes communication links 411, 421, 431, 441, 451, 461, 471, 481, and 491. In the illustrated embodiment of FIG. 5, communication links 411, 421, 431, 441, 451, 461, 471, 481, and 491, disposed in channel 0 interconnect with data ports 502 and 504. Similarly, communication links 411, 421, 431, 441, 451, 461, 471, 481, and 491, disposed in channels 1, 2, 3, 4, 5, 6, and 7, interconnect with data ports 512/514, 522/524, 532/534, 542/544, 552/554, 562/564, and 572/574, respectively.

Data ports 502/504 communicate with multiplexer module 580 via communication links 506/508, respectively. Data ports 512/514 communicate with multiplexer module 580 via communication links 516/518, respectively. Data ports 522/524 communicate with multiplexer module 580 via communication links 526/528, respectively. Data ports 532/534 communicate with multiplexer module 580 via communication links 536/538, respectively. Data ports 542/544 communicate with multiplexer module 580 via communication links 546/548, respectively. Data ports 552/554 communicate with multiplexer module 580 via communication links 556/558, respectively. Data ports 562/564 communicate with multiplexer module 580 via communication links 566/568, respectively. Data ports 572/574 communicate with multiplexer module 580 via communication links 576/578, respectively.

Multiplexer module 580 communicates over one or more communication links with demultiplexer module 581. Demultiplexer module 581 provides data to SRAM 590 via communication links 582, 583, 584, 585, 586, 587, 588, and 589, which interconnect SRAM 590 with SRAM blocks 591, 592, 593, 594, 595, 596, 587, and 598, respectively. The design of multiplexer module 580 and demultiplexer module 581, and the number of communication links interconnecting multiplexer module 580 and demultiplexer module 581, is a function of the number of testports used to capture data.

Figure 6:
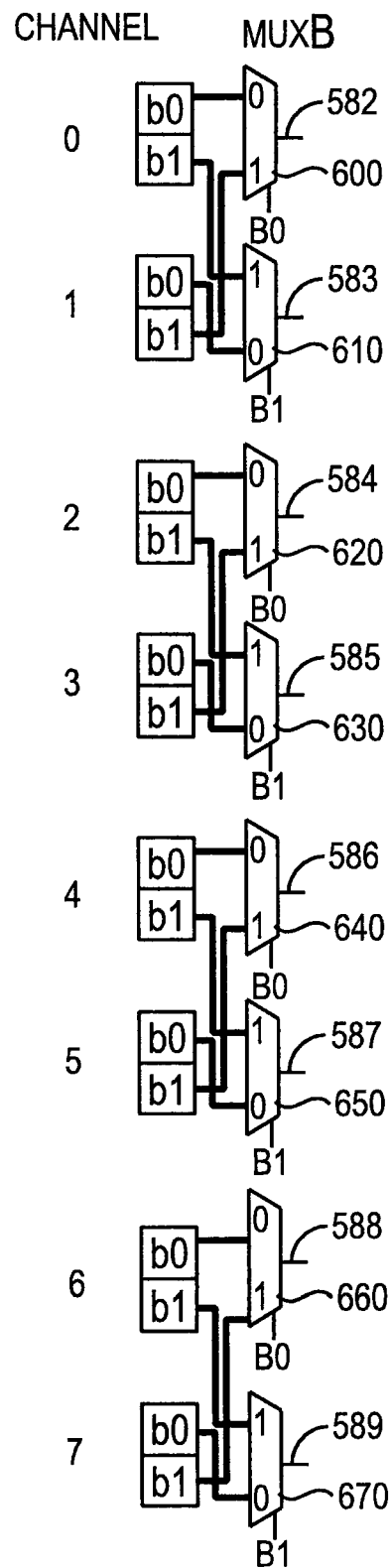
FIG. 6 is a block diagram showing the multiplexer/demultiplexer circuits and communication links used to capture information from 8 different testports.
Figure 7:
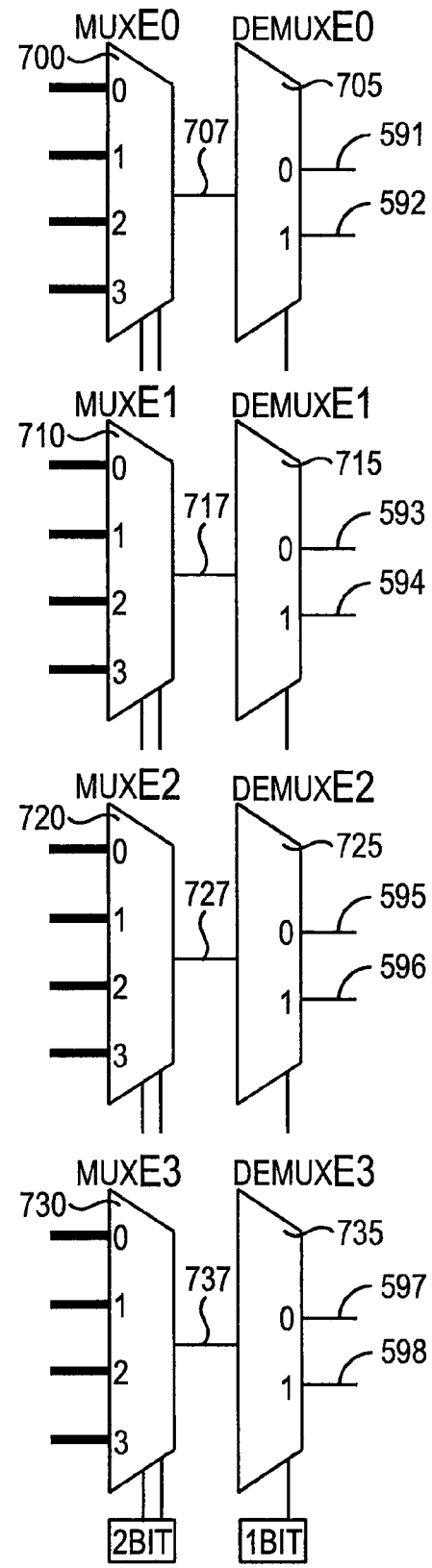
FIG. 7 is a block diagram showing the multiplexer/demultiplexer circuits and communication links used to capture information from 4 different testports.

For example, if Applicants' apparatus is used to capture data in real time from 8 channels then the embodiment of FIG. 6 is used wherein multiplexer module 580 comprises multiplexers 600, 610, 620, 630, 640, 650, 660, and 670. In this 8 channel data capture embodiment, no demultiplexer is used. If Applicants' apparatus is used to capture data in real time from 4 channels then the embodiment of FIG. 7 is used wherein multiplexer module 580 comprises multiplexers 700, 710, 720, and 730, and wherein demultiplexer module 581 includes demultiplexers 705, 715, 725, and 735. Multiplexers 700, 710, 720, and 730, provide data to demultiplexers 705, 715, 725, and 735, respectively, using communication links 707, 717, 727, and 737, respectively.

Figure 8:
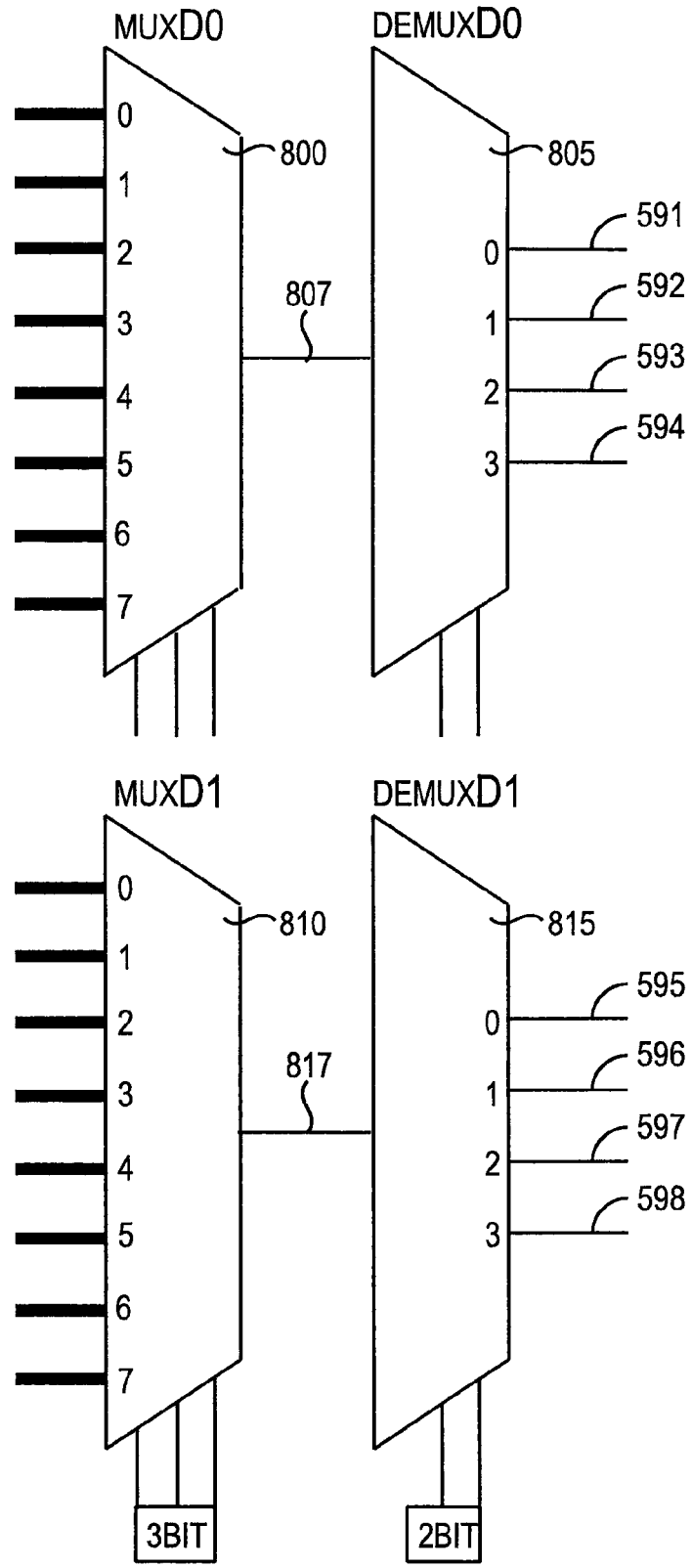
FIG. 8 is a block diagram showing the multiplexer/demultiplexer circuits and communication links used to capture information from 2 different testports.
Figure 9:
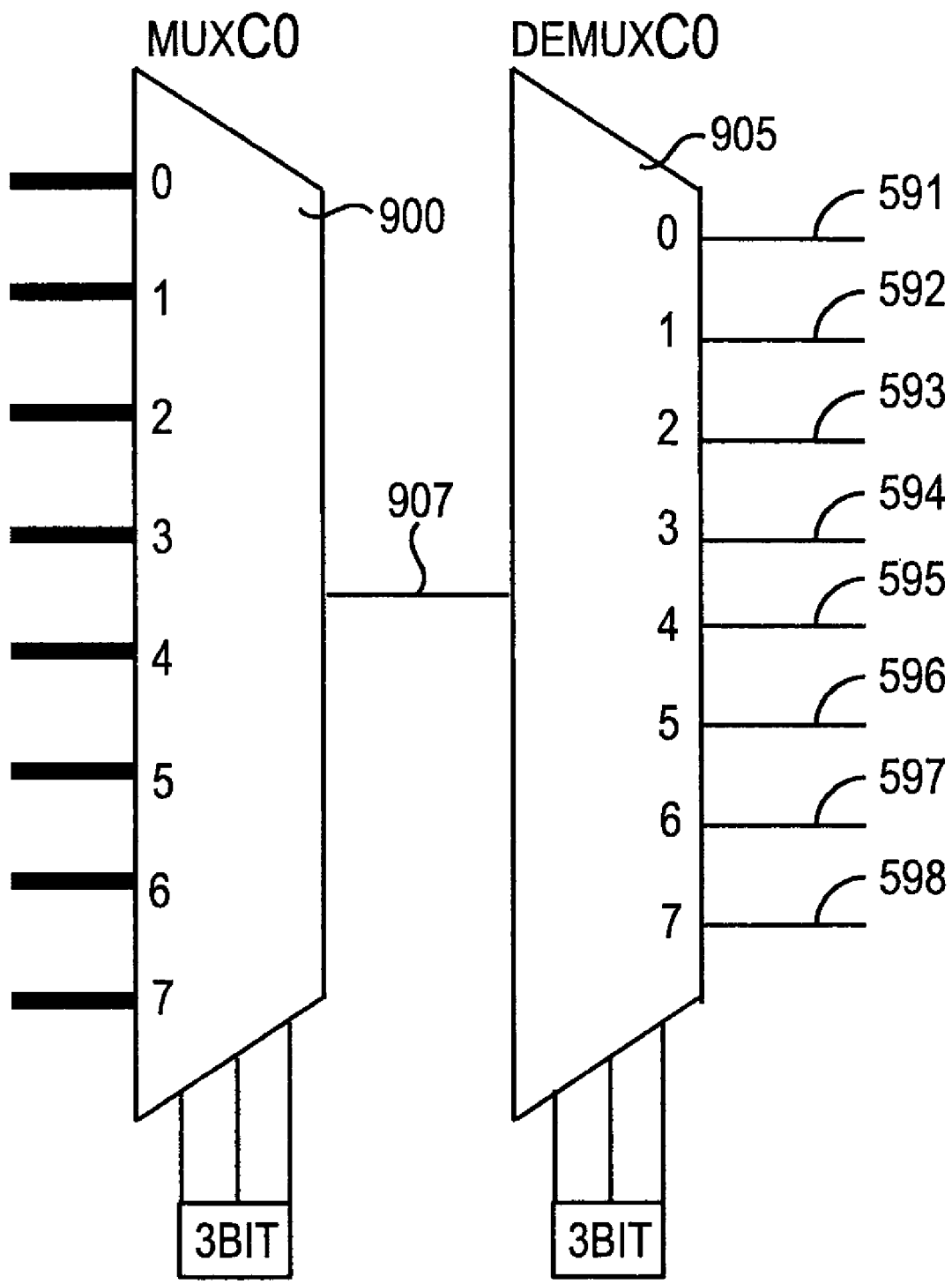
FIG. 9 is a block diagram showing the multiplexer/demultiplexer circuits and communication links used to capture information from 1 testport.

If Applicants' apparatus is used to capture data in real time from 2 channels then the embodiment of FIG. 8 is used wherein multiplexer module 580 comprises multiplexers 800 and 810, and wherein demultiplexer module 581 includes demultiplexers 805 and 815. Multiplexers 800 and 810 provide data to demultiplexers 805 and 815, respectively, using communication links 807 and 817, respectively. If Applicants' apparatus is used to capture data in real time from 1 channel then the embodiment of FIG. 9 is used wherein multiplexer module 580 comprises multiplexer 900 and wherein demultiplexer module 581 comprises demultiplexer 905. Multiplexer 900 provides data to demultiplexer 905 using communication link 907.

In certain embodiments, the devices, testports, communication links, and the like, described in FIGS. 4, 5, 6, 7, 8, and 9, are implemented in hard wired circuitry. In certain embodiments, some or all of the devices, testports, communication links, and the like, described in FIGS. 4, 5, 6, 7, 8, and 9, can be implemented in special purpose processors. In certain embodiments, some or all of the devices, testports, communication links, and the like, described in FIGS. 4, 5, 6, 7, 8, and 9, can be implemented in high speed general purpose programmed processors. In certain embodiments, some or all of the devices, testports, communication links, and the like, described in FIGS. 4, 5, 6, 7, 8, and 9 may comprise one or more application specific integrated circuits, i.e. "ASICs."

Figure 10:
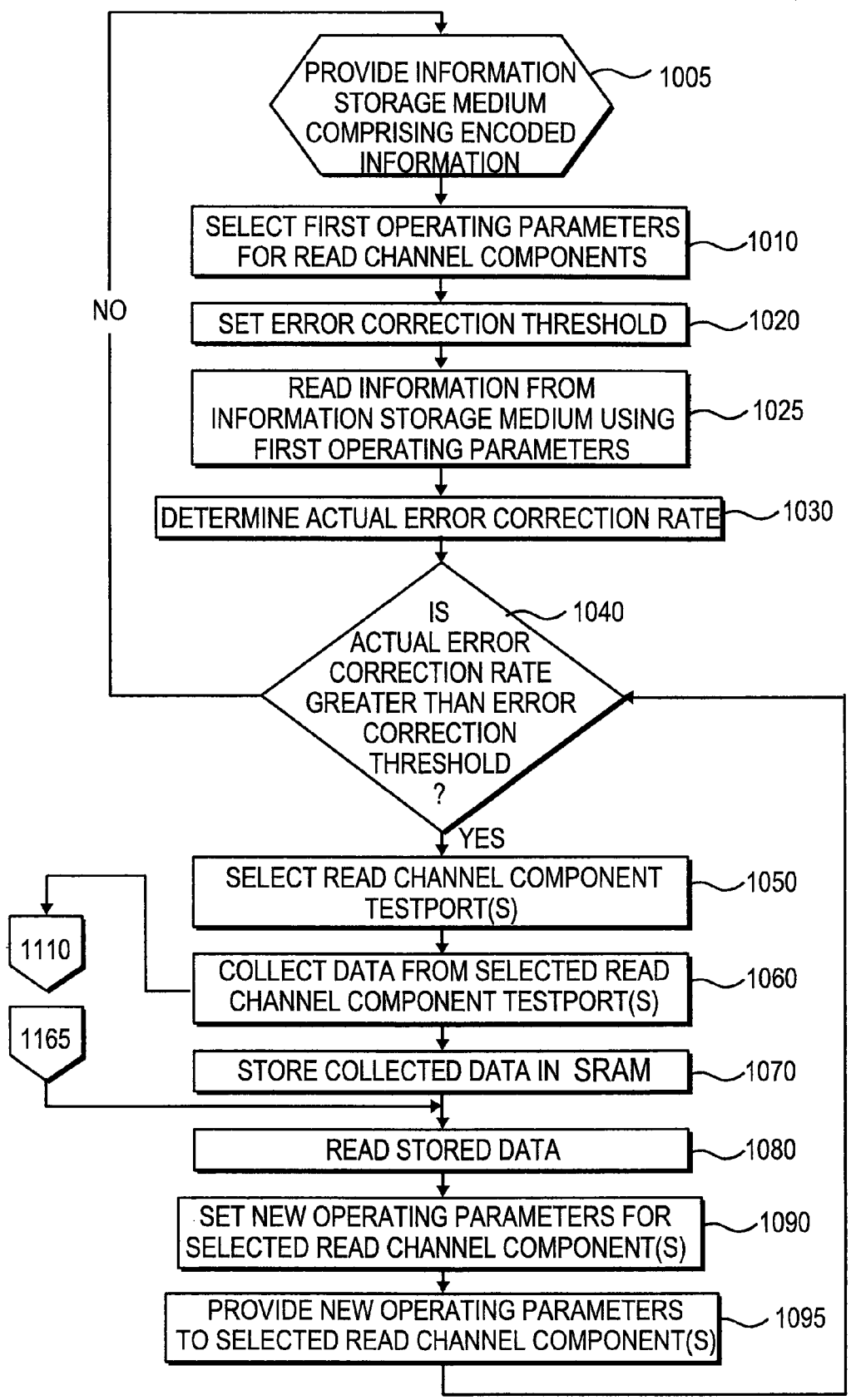
FIG. 10 is a flowchart summarizing the steps of Applicants' method to read information from an information storage medium.

Applicants' invention includes a method to read information using Applicants' read channel from an information storage medium. Referring now to FIG. 10, in step 1005 Applicants' method provides an information storage medium having information encoded thereon. In certain embodiments, such an information storage medium comprises a magnetic storage medium, an optical storage medium, an electronic storage medium, and/or combinations thereof. By "magnetic storage medium," Applicants mean a medium wherein one or more magnetic properties can be differentially adjusted to encode information therein. By "optical storage medium," Applicants mean a medium wherein one or more optical properties can be differentially adjusted to encode information therein. By "electronic storage media," Applicants mean a device such as a PROM, EPROM, EEPROM, Flash PROM, compactflash, smartmedia, and the like.

In step 1010, Applicants' method selects one or more initial operating parameters, i.e. first operating parameters, for one or more components comprising Applicants' read channel. By "read channel," Applicants mean the devices used to retrieve information from an information storage medium, adjust/amplify/error-correct that information, and communicate that information to one or more requesting computers. In certain embodiments, Applicants' read channel includes the devices and communication links recited on FIGS. 4, 5, 6, 7, 8, and 9.

In certain embodiments, step 1010 is performed by a storage device controller, such as device controller 134 (FIGS. 1, 3, 4) or device controller 144 (FIGS. 1, 3, 4). In certain embodiments, step 1010 is performed by a host computer, such as host computer 390 (FIGS. 1, 3). In certain embodiments, step 1010 is performed by a data storage and retrieval system controller, such as controller 160 (FIG. 1). In certain embodiments, step 1010 is performed by a user using an operator input station, such as station 150 (FIG. 1).

In certain embodiments, the initial operating parameters of step 1010 comprise those operating parameters established at the time a read channel device was manufactured. In certain embodiments, the initial operating parameters of step 1010 comprise those operating parameters established at the time the read channel was manufactured. In certain embodiments, the initial operating parameters of step 1010 comprise those operating parameters established at the time one or more read channel devices were manufactured in combination with one or more operating parameters determined when the read channel was manufactured. In certain embodiments, the one or more initial operating parameters are stored in a data storage device controller, such as controller 134 (FIGS. 1, 3) and/or 144 (FIGS. 1, 3).

In step 1020, Applicants' method sets an error correction threshold. As described above, Applicants' read channel includes error correction module 495. The error correction threshold of step 1020 comprises the maximum acceptable error rate, i.e. the maximum acceptable rate at which one or more corrections are made to the digital signal provided to the error correction module. In certain embodiments, the error correction threshold is determined by the user. In certain embodiments, the error correction threshold is set in firmware disposed in a data storage device controller. In certain embodiments, the error correction threshold is set in firmware disposed in a data storage and retrieval system controller. In certain embodiments, the error correction threshold is set by the system user. In certain embodiments, the error correction threshold is determined by a host computer.

As those skilled in the art will appreciate, information is read from an information storage medium over a period of time. As described above, Applicants' method first forms an analog waveform comprising the information encoded in the information storage medium. That analog waveform is continuously formed over the time interval. Over the time interval, a digital signal is formed from that analog waveform. In step 1025, Applicants' method, over a first portion of the time interval, reads information from the information storage medium using the first operating parameters of step 1010.

In step 1030, Applicants' method error corrects the digital signal formed using the first operating parameters. Step 1030 further includes determining an actual error correction rate. In certain embodiments, step 1030 is performed by a storage device controller, such as device controller 134 (FIGS. 1, 3, 4) or device controller 144 (FIGS. 1, 3, 4). In certain embodiments, step 1030 is performed by a host computer, such as host computer 390 (FIGS. 1, 3). In certain embodiments, step 1030 is performed by a data storage and retrieval system controller, such as controller 160 (FIG. 1).

In step 1040, Applicants' method determines if the actual error correction rate of step 1030 is greater than the error-correction threshold of step 1020. In certain embodiments, step 1040 is performed by a storage device controller, such as device controller 134 (FIGS. 1, 3, 4) or device controller 144 (FIGS. 1, 3, 4). In certain embodiments, step 1040 is performed by a host computer, such as host computer 390 (FIGS. 1, 3). In certain embodiments, step 1040 is performed by a data storage and retrieval system controller, such as controller 160 (FIG. 1). In certain embodiments, step 1040 is performed by a user using an operator input station, such as station 150 (FIG. 1).

If Applicants' method determines in step 1040 that the actual error correction rate is not greater than the error correction threshold, then Applicants' method transitions from step 1040 to step 1005 and continues reading information from the information storage medium using the first operating parameters. Alternatively, if Applicants' method determines in step 1040 that the actual error correction rate is greater than the threshold error correction threshold, then Applicants' method adjusts the operating parameters of one or more read channel devices to reduce the actual error correction rate.

More specifically, if Applicants' method determines in step 1040 that the actual error correction rate is greater than the error correction threshold, then Applicants' method transitions from step 1040 to step 1050 wherein Applicants' method selects one or more read channel devices to optimize. In certain embodiments, those one or more read channel devices are selected from the group consisting of equalizer 415, mid-linear filter 425, sample interpolator 435, gain control module 445, phase error generator 455, PLL circuit 465, phase interpolator 475, and maximum likelihood detector 485.

In certain embodiments, step 1050 is performed by a storage device controller, such as device controller 134 (FIGS. 1, 3, 4) or device controller 144 (FIGS. 1, 3, 4). In certain embodiments, step 1050 is performed by a host computer, such as host computer 390 (FIGS. 1, 3). In certain embodiments, step 1050 is performed by a data storage and retrieval system controller, such as controller 160 (FIG. 1). In certain embodiments, step 1050 is performed by a user using an operator input station, such as station 150 (FIG. 1).

In step 1060, Applicants' method collects data from the one or more testports selected in step 1050. In certain embodiments, step 1060 includes activating those one or more testports, such as one or more of testports 410, 420, 430, 440, 450, 460, 470, 479, 480, and 490. In certain embodiments, step 1060 includes communicating data from these one or more testports to a data cache, such as data cache 403.

In certain embodiments, step 1060 includes collecting information from a single testport disposed in a single read channel. In certain embodiments, step 1060 includes collecting information from a plurality of testports disposed in a single read channel. In certain embodiments, step 1060 includes collecting information from a plurality of testports disposed in a plurality of read channels.

In certain embodiments, step 1060 is performed by a storage device controller, such as device controller 134 (FIGS. 1, 3, 4) or device controller 144 (FIGS. 1, 3, 4). In certain embodiments, step 1060 is performed by a host computer, such as host computer 390 (FIGS. 1, 3). In certain embodiments, step 1060 is performed by a data storage and retrieval system controller, such as controller 160 (FIG. 1).

In step 1070, Applicants' method stores the information collected in step 1060 in a data cache, such as data cache 403. In step 1080, the information stored in step 1070 is read by a controller. In certain embodiments, step 1080 is performed by a storage device controller, such as device controller 134 (FIGS. 1, 3, 4) or device controller 144 (FIGS. 1, 3, 4). In certain embodiments, step 1080 is performed by a host computer, such as host computer 390 (FIGS. 1, 3). In certain embodiments, step 1080 is performed by a data storage and retrieval system controller, such as controller 160 (FIG. 1).

Using the information read in step 1080, in step 1090 Applicants' method generates adjusted operating parameters for the devices selected in step 1050. In certain embodiments, step 1090 is performed by a storage device controller, such as device controller 134 (FIGS. 1, 3, 4) or device controller 144 (FIGS. 1, 3, 4). In certain embodiments, step 1090 is performed by a host computer, such as host computer 390 (FIGS. 1, 3). In certain embodiments, step 1090 is performed by a data storage and retrieval system controller, such as controller 160 (FIG. 1).

In step 1095, the adjusted operating parameters of step 1090 are provided to the devices selected in step 1050. In certain embodiments, step 1095 is performed by a storage device controller, such as device controller 134 (FIGS. 1, 3, 4) or device controller 144 (FIGS. 1, 3, 4). In certain embodiments, step 1095 is performed by a host computer, such as host computer 390 (FIGS. 1, 3). In certain embodiments, step 1095 is performed by a data storage and retrieval system controller, such as controller 160 (FIG. 1).

In certain embodiments, step 1095 includes communicating the adjusted operating parameters using one or more of communication links 407, 417, 427, 437, 447, 457, 467, 477, and 487. Applicants' method transitions from step 1095 to step 1040 and continues.

FIG. 11 summarizes the steps of Applicants' method to capture data from one or more read channels using one or more testports. Applicants' method transitions from step 1050 (FIG. 10), wherein one or more testports are selected, to step 1110 wherein Applicants' method sets the output of those one or more selected testports as the signal source. In certain embodiments, step 1110 is performed by a storage device controller, such as device controller 134 (FIGS. 1, 3, 4) or device controller 144 (FIGS. 1, 3, 4). In certain embodiments, step 1110 is performed by a host computer, such as host computer 390 (FIGS. 1, 3). In certain embodiments, step 1110 is performed by a data storage and retrieval system controller, such as controller 160 (FIG. 1).

In step 1115, Applicants' method enables the SRAM core. In certain embodiments, step 1115 is performed by a storage device controller, such as device controller 134 or device controller 144. In certain embodiments, step 1115 is performed by a host computer, such as host computer 390. In certain embodiments, step 1115 is performed by a data storage and retrieval system controller, such as controller 160.

In step 1120, Applicants' method selects (N) data channels for input to the SRAM. In certain embodiments, (N) is an integer greater than or equal to 1 and less than or equal to 8. If data is being captured from a single testport in a single read channel, then (N) is set to 1. If data is being captured from 8 different read channels, then (N) is set to 8. In certain embodiments, step 1120 is performed by a storage device controller, such as device controller 134 or device controller 144. In certain embodiments, step 1120 is performed by a host computer, such as host computer 390. In certain embodiments, step 1120 is performed by a data storage and retrieval system controller, such as controller 160.

In step 1125, Applicants' method selects the trigger. By "trigger," Applicants mean the signal which initiates data capture. In certain embodiments, the trigger comprises a signal from error correction module 495 that the actual error correction rate is greater than the threshold error correction rate. In certain embodiments, the trigger comprises a signal from error correction module 495 that the read head is over calibration fields on the recording media, i.e. a "DSS" trigger. In certain embodiments, the trigger comprises a signal from a data storage device controller, such as controller 134 (FIGS. 1, 3, 4). In certain embodiments, the trigger comprises a signal from a data storage and retrieval system controller, such as controller 160 (FIG. 1). In certain embodiments, the trigger comprises a signal from a host computer, such as host 390 (FIGS. 1, 3). In certain embodiments, the trigger comprises a signal from an operator input station, such as operator input station 150 (FIG. 1).

In step 1130, Applicants' method sets the SRAM to capture data of every 8/(N)th clock. In certain embodiments, step 1135 is performed by a storage device controller, such as device controller 134/144. In certain embodiments, step 1135 is performed by a host computer, such as host computer 390. In certain embodiments, step 1135 is performed by a data storage and retrieval system controller, such as controller 160.

In step 1135, Applicants' method selects a MUX/DEMUX module for data capture. For example, if data is captured from 8 different testports, then Applicants' method selects the MUX module shown in FIG. 6. If data is captured from 4 different testports, then Applicants' method selects the MUX/DEMUX module shown in FIG. 7. If data is captured from 2 different testports, then Applicants' method selects the MUX/DEMUX module shown in FIG. 8. If data is captured from 1 testport, then Applicants' method selects the MUX/DEMUX module shown in FIG. 8. In certain embodiments, step 1135 is performed by a storage device controller, such as device controller 134 or device controller 144. In certain embodiments, step 1135 is performed by a host computer, such as host computer 390. In certain embodiments, step 1135 is performed by a data storage and retrieval system controller, such as controller 160.

In step 1140, Applicants' method disables the external SRAM write feature. In certain embodiments, step 1140 is performed by a storage device controller, such as device controller 134 or device controller 144. In certain embodiments, step 1140 is performed by a host computer, such as host computer 390. In certain embodiments, step 1140 is performed by a data storage and retrieval system controller, such as controller 160.

In step 1145, Applicants' method sets the SRAM interface to start sampling when the selected trigger is detected. In certain embodiments, step 1145 is performed by a storage device controller, such as device controller 134 or device controller 144. In certain embodiments, step 1145 is performed by a host computer, such as host computer 390. In certain embodiments, step 1145 is performed by a data storage and retrieval system controller, such as controller 160.

In step 1150, Applicants' method enables the selected trigger. In certain embodiments, step 1150 is performed by a storage device controller, such as device controller 134 or device controller 144. In certain embodiments, step 1150 is performed by a host computer, such as host computer 390. In certain embodiments, step 1150 is performed by a data storage and retrieval system controller, such as controller 160.

In step 1155, Applicants' method waits until the selected trigger is detected. In certain embodiments, step 1155 is performed by a storage device controller, such as device controller 134 or device controller 144. In certain embodiments, step 1155 is performed by a host computer, such as host computer 390. In certain embodiments, step 1155 is performed by a data storage and retrieval system controller, such as controller 160.

In step 1160, Applicants' method determines if the selected trigger has been detected. In certain embodiments, step 1160 is performed by a storage device controller, such as device controller 134 or device controller 144. In certain embodiments, step 1160 is performed by a host computer, such as host computer 390. In certain embodiments, step 1160 is performed by a data storage and retrieval system controller, such as controller 160. If Applicants' method determines in step 1160 that the selected trigger has not been detected, then Applicants' method transitions from step 1160 to step 1155.

Alternatively, if Applicants' method determines in step 1160 that the selected trigger is detected, then Applicants' method transitions from step 1160 to step 1165 wherein Applicants' method collects data on the testports selected in step 1050 (FIG. 10). In certain embodiments, step 1165 is performed by a storage device controller, such as device controller 134 or device controller 144. In certain embodiments, step 1165 is performed by a host computer, such as host computer 390. In certain embodiments, step 1165 is performed by a data storage and retrieval system controller, such as controller 160.

In step 1170, Applicants' method determines if the data cache is filled. In certain embodiments, step 1170 is performed by a storage device controller, such as device controller 134 or device controller 144. In certain embodiments, step 1170 is performed by a host computer, such as host computer 390. In certain embodiments, step 1170 is performed by a data storage and retrieval system controller, such as controller 160. If Applicants' method determines in step 1170 that the data cache is filled, then Applicants' method transitions from step 1170 to step 1080 (FIG. 10). Alternatively, if Applicants' method determines in step 1170 that the data cache is not filled, then Applicants' method transitions from step 1170 to step 1165 wherein Applicants' method continues to collect data on the selected channel.

The embodiments of Applicants' method recited in FIGS. 10 and 11 may be implemented separately. Moreover, in certain embodiments, individual steps recited in FIGS. 10 and/or 11 may be combined, eliminated, or reordered.

Examples I and II are presented to further illustrate to persons skilled in the art how to make and use the invention and to identify certain embodiments thereof. These examples are not intended as limitations, however, upon the scope of the invention, which is defined only by the appended claims.

Example I

In Example I the first digital signal, i.e. the input to equalizer 415, is captured from testport 410 disposed on eight different read channels using a DSS trigger. Table I recites various registers, register settings, and descriptions of steps used to capture the first digital signal for later analysis. In certain embodiments, the registers shown in TABLE I are disposed in a microprocessor interface 401. If in this example, the data cache comprises about 4 KB of memory, then each of the 8 signal sources is allocated about 500 B of that memory.

In certain embodiments, the registers shown in TABLE I are disposed in a data storage and retrieval system controller. In certain embodiments, the registers shown in TABLE I are disposed in a host computer.

TABLE I

| REGISTER | SETTING | DESCRIPTION |
|---|---|---|
| XR_TPSEL0_M | X'00' | Set the output of testport0 to equalizer input |
| XR_RAMCTL1_M | X'20' | Enable the SRAM core |
| XR_RAMCTL2_M | X'A8' | Select data channels for input to SRAM<br>Disable the microprocessor trigger<br>Enable DSS trigger<br>Disable the trigger on byte compare<br>Hold SRAM interface in a reset mode<br>Disable SRAM any external microprocessor writes<br>Set the SRAM to capture data on every clock |
| XR_RAMMUX1_M | X'00' | Select MUX-B as the SRAM source<br>Select testport 0 as the MUX-B input |
| XR_RAMADDIH_M | X'00' | Disable the external SRAM write feature |
| XR_RAMTRIGX_M | X'00' | Set the SRAM interface to start sampling when DSS is detected |
| XR_RAMCTL2_M | X'A0' | Enable SRAM interface |
| XR_RAMSTAT_M | If = X'80'<br>If = X'00' | Then the SRAM has been filled<br>Then the SRAM has not been filled |

Example II

In Example II the first digital signal, i.e. the input to equalizer 415, is captured from testport 410 on read channel 5 using a storage device microprocessor trigger. Table II recites various registers, register settings, and descriptions of steps used to capture the first digital signal for later analysis. In certain embodiments, the registers shown in TABLE II are disposed in a microprocessor interface 401. In this example, all the memory capability of the data cache is allocated to data captured from the single signal source.

In certain embodiments, the registers shown in TABLE II are disposed in a data storage and retrieval system controller. In certain embodiments, the registers shown in TABLE II are disposed in a host computer.

TABLE II

| REGISTER | SETTING | DESCRIPTION |
|---|---|---|
| XR_TPSEL0_M | X'00' | Set the output of testport0 to equalizer input |
| XR_RAMCTL1_M | X'20' | Enable the SRAM core |
| XR_RAMCTL2_M | X'CB' | Select data channels for input to SRAM<br>Enable the microprocessor trigger<br>Disable the DSS trigger<br>Disable the trigger on byte compare<br>Hold SRAM interface in a reset mode<br>Disable SRAM any external microprocessor writes<br>Set the SRAM to capture data on every $8^{th}$ clock |
| XR_RAMMUX1_M | X'4A' | Select MUX-C as the SRAM source<br>Select testport 0 as the MUX-B input |
| XR_RAMADDIH_M | X'00' | Disable the external SRAM write feature |
| XR_RAMTRIGX_M | X'00' | Set the SRAM interface to start sampling when DSS is detected |
| XR_RAMCTL2_M | X'C3' | Enable SRAM interface |
| XR_RAMTRIGX_M | X'80' | Start data collection on channel 5 |
| XR_RAMSTAT_M | If = X'80'<br>If = X'00' | Then the SRAM has been filled<br>Then the SRAM has not been filled |

Applicants' invention includes an article of manufacture comprising a computer useable medium having computer readable program code disposed therein to read data from an information storage medium using Applicants' read channel assembly. Applicants' invention further includes a computer program product usable with a programmable computer processor having computer readable program code embodied therein method to read data from an information storage medium using Applicants' read channel assembly.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to read information from an information storage medium using an asynchronous read channel comprising a data cache, comprising the steps of:
   generating over a time interval an analog waveform comprising said information;
   providing throughout said time interval said analog waveform to an analog to digital converter disposed in said asynchronous read channel, wherein said analog to digital converter is interconnected with a finite impulse response filter by a first communication link comprising a test port, and wherein said test port is interconnected with said data cache by a second communication link, and wherein said data cache is interconnected by a third communication link with a microprocessor interface comprising a plurality of registers, wherein each of said plurality of registers comprises a different register setting;
   providing a controller comprising one or more first operating parameters for said read channel;
   providing said one or more first operating parameters to said read channel;
   generating a digital signal throughout a first portion of said time interval from said analog waveform using said one or more first operating parameters;
   setting an error correction rate threshold;
   error correcting said digital signal during said first portion of said time interval at an actual error correction rate;
   determining if said actual error correction rate is greater than said error correction rate threshold;
   operative if said actual error correction rate is not greater than said error correction rate threshold, continuing to generate said digital signal throughout said time interval using said one or more first operating parameters;
   operative if said actual error correction rate is greater than said error correction rate threshold:
   capturing said digital signal using said test port and said register settings;
   storing said digital signal in said data cache during said first portion of said time interval;
   reading said digital signal from said cache by said controller during said first portion of said time interval;
   generating by said controller one or more second operating parameters during said first portion of said time interval;
   providing said one or more second operating parameters to said read channel during said first portion of said time interval;
   generating said digital signal using said one or more second operating parameters during a second portion of said time interval.

2. The method of claim 1, wherein said read channel comprises an equalizer and wherein said controller comprises one or more first equalizer operating parameters, further comprising the steps of:
   providing to said equalizer said one or more first equalizer operating parameters;
   generating said digital signal using said one or more first equalizer operating parameters during said first portion of said time interval;
   operative if said actual error correction rate is greater than said error correction rate threshold:
   generating by said controller one or more second equalizer operating parameters during said first portion of said time interval;
   providing said one or more second equalizer operating parameters to said equalizer during said first portion of said time interval;
   generating said digital signal using said one or more second equalizer operating parameters during said second portion of said time interval.

3. The method of claim 1, wherein said read channel comprises a mid-linear filter and wherein said controller comprises one or more first mid-linear filter operating parameters, further comprising the steps of:
   providing to said mid-linear filter said one or more first equalizer operating parameters;
   generating said digital signal using said one or more first mid-linear filter operating parameters during said first portion of said time interval;
   operative if said actual error correction rate is greater than said error correction rate threshold:
   generating by said controller one or more second mid-linear filter operating parameters during said first portion of said time interval;
   providing said one or more second mid-linear filter operating parameters to said mid-linear filter during said first portion of said time interval;
   generating said digital signal using said one or more second mid-linear filter operating parameters during said second portion of said time interval.

4. The method of claim 1, wherein said read channel comprises a sample interpolator and wherein said controller comprises one or more first sample interpolator operating parameters, further comprising the steps of:
   providing to said sample interpolator said one or more first sample interpolator operating parameters;
   generating said digital signal using said one or more first sample interpolator operating parameters during said first portion of said time interval;
   operative if said actual error correction rate is greater than said error correction rate threshold:
   generating by said controller one or more second sample interpolator operating parameters during said first portion of said time interval;
   providing said one or more second sample interpolator operating parameters to said sample interpolator during said first portion of said time interval;
   generating said digital signal using said one or more second sample interpolator parameters during said second portion of said time interval.

5. The method of claim 1, wherein said read channel comprises a gain control module and wherein said controller comprises one or more first gain control module operating parameters, further comprising the steps of:
   providing to said gain control module said one or more first gain control module operating parameters;
   generating said digital signal using said one or more first gain control module operating parameters during said first portion of said time interval;
   operative if said actual error correction rate is greater than said error correction rate threshold:
   generating by said controller one or more second gain control module operating parameters during said first portion of said time interval;
   providing said one or more second gain control module operating parameters to said gain control module during said first portion of said time interval;
   generating said digital signal using said one or more second gain control module operating parameters during said second portion of said time interval.

6. The method of claim 1, wherein said read channel comprises a phase error generator and wherein said controller comprises one or more first phase error generator operating parameters, further comprising the steps of:

providing to said phase error generator said one or more first phase error generator operating parameters;

generating said digital signal using said one or more first phase error generator operating parameters during said first portion of said time interval;

operative if said actual error correction rate is greater than said error correction rate threshold:

generating by said controller one or more second phase error generator operating parameters during said first portion of said time interval;

providing said one or more second phase error generator operating parameters to said phase error generator during said first portion of said time interval;

generating said digital signal using said one or more second phase error generator operating parameters during said second portion of said time interval.

7. The method of claim 1, wherein said read channel further a PLL circuit and wherein said controller comprises one or more first a PLL circuit operating parameters, further comprising the steps of:

providing to said a PLL circuit said one or more first a PLL circuit operating parameters;

generating said digital signal using said one or more first a PLL circuit operating parameters during said first portion of said time interval;

operative if said actual error correction rate is greater than said error correction rate threshold:

generating by said controller one or more second a PLL circuit operating parameters during said first portion of said time interval;

providing said one or more second a PLL circuit operating parameters to said a PLL circuit during said first portion of said time interval;

generating said digital signal using said one or more second a PLL circuit operating parameters during second portion of said time interval.

8. The method of claim 1, wherein said read channel comprises a phase interpolator and wherein said controller comprises one or more first phase interpolator operating parameters, further comprising the steps of:

providing to said phase interpolator said one or more first phase interpolator operating parameters;

generating said digital signal using said one or more first phase interpolator operating parameters during said first portion of said time interval;

operative if said actual error correction rate is greater than said error correction rate threshold:

generating by said controller one or more second phase interpolator operating parameters during said first portion of said time interval;

providing said one or more second phase interpolator operating parameters to said phase interpolator during said first portion of said time interval;

generating said digital signal using said one or more second phase interpolator operating parameters during said second portion of said time interval.

9. The method of claim 1, wherein said read channel comprises a maximum likelihood detector and wherein said controller comprises one or more first maximum likelihood detector operating parameters, further comprising the steps of:

providing to said maximum likelihood detector said one or more first maximum likelihood detector operating parameters;

generating said digital signal using said one or more first maximum likelihood detector operating parameters during said first portion of said time interval;

operative if said actual error correction rate is greater than said error correction rate threshold:

generating by said controller one or more second maximum likelihood detector operating parameters during said first portion of said time interval;

providing said one or more second maximum likelihood detector operating parameters to said sample interpolator during said first portion of said time interval;

generating said digital signal using said one or more second maximum likelihood detector operating parameters during a second portion of said time interval.

10. An article of manufacture comprising a computer useable medium having computer readable program code disposed therein to read information from an information storage medium using an asynchronous read channel, wherein said article of manufacture further comprises a controller and one or more first operating parameters for said read channel, and wherein said read channel comprises a data cache, the computer readable program code comprising a series of computer readable program steps to effect:

generating over a time interval an analog waveform comprising said information;

providing throughout said time interval said analog waveform to an analog to digital converter disposed in said asynchronous read channel, wherein said analog to digital converter is interconnected with a finite impulse response filter by a communication link comprising a test port, and wherein said test port is interconnected with said data cache by a second communication link, and wherein said data cache is interconnected by a third communication link with a microprocessor interface comprising a plurality of registers, wherein each of said plurality of registers comprises a different register setting;

providing said one or more first operating parameters to said read channel;

generating a digital signal throughout a first portion of said time interval from said analog waveform using said one or more first operating parameters;

setting an error correction rate threshold;

error correcting said digital signal during said first portion of said time interval at an actual error correction rate;

determining if said actual error correction rate is greater than said error correction rate threshold;

operative if said actual error correction rate is not greater than said error correction rate threshold, continuing to generate said digital signal throughout said time interval using said one or more first operating parameters;

operative if said actual error correction rate is greater than said error correction rate threshold:

capturing said digital signal using said test port and said register settings;

storing said digital signal in said data cache during said first portion of said time interval;

reading said digital signal from said cache by said controller during said first portion of said time interval;

generating by said controller one or more second operating parameters during said first portion of said time interval;

providing said one or more second operating parameters to said read channel during said first portion of said time interval;

generating said digital signal using said one or more second operating parameters during a second portion of said time interval.

11. The article of manufacture of claim 10, wherein said read channel comprises an equalizer and wherein said controller comprises one or more first equalizer operating parameters, said computer readable program code further comprising a series of computer readable program steps to effect:

provinding to said equalizer said one or more first equalizer operating parameters;

generating said digital signal using said one or more first equalizer operating parameters during said first portion of said time interval;

operative if said actual error correction rate is greater than said error correction rate threshold:

generating by said controller one or more second equalizer operating parameters during said first portion of said time interval;

providing said one or more second equalizer operating parameters to said equalizer during said first portion of said time interval;

generating said digital signal using said one or more second equalizer operating parameters during said second portion of said time interval.

12. The article of manufacture of claim 10, wherein said read channel comprises a mid-linear filter, and wherein said controller comprises one or more first mid-linear filter operating parameters, said computer readable program code further comprising a series of computer readable program steps to effect:

providing to said mid-linear filter said one or more first equalizer operating parameters;

generating said digital signal using said one or more first mid-linear filter operating parameters during said first portion of said time interval;

operative if said actual error correction rate is greater than said error correction rate threshold:

generating by said controller one or more second mid-linear filter operating parameters during said first portion of said time interval;

providing said one or more second mid-linear filter operating parameters to said mid-linear filter during said first portion of said time interval;

generating said digital signal using said one or more second mid-linear filter operating parameters during said second portion of said time interval.

13. The article of manufacture of claim 10, wherein said read channel comprises a sample interpolator, and wherein said controller comprises one or more first sample interpolator operating parameters, said computer readable program code further comprising a series of computer readable program steps to effect:

providing to said sample interpolator said one or more first sample interpolator operating parameters;

generating said digital signal using said one or more first sample interpolator operating parameters during said first portion of said time interval;

operative if said actual error correction rate is greater than said error correction rate threshold:

generating by said controller one or more second sample interpolator operating parameters during said first portion of said time interval;

providing said one or more second sample interpolator operating parameters to said sample interpolator during said first portion of said time interval;

generating said digital signal using said one or more second sample interpolator parameters during said second portion of said time interval.

14. The article of manufacture of claim 10, wherein said read channel comprises a gain control module, and wherein said controller comprises one or more first gain control module operating parameters, said computer readable program code further comprising a series of computer readable program steps to effect:

providing to said gain control module said one or more first gain control module operating parameters;

generating said digital signal using said one or more first gain control module operating parameters during said first portion of said time interval;

operative if said actual error correction rate is greater than said error correction rate threshold:

generating by said controller one or more second gain control module operating parameters during said first portion of said time interval;

providing said one or more second gain control module operating parameters to said gain control module during said first portion of said time interval;

generating said digital signal using said one or more second gain control module operating parameters during said second portion of said time interval.

15. The article of manufacture of claim 10, wherein said read channel comprises a phase error generator, and wherein said controller comprises one or more first phase error generator operating parameters, said computer readable program code further comprising a series of computer readable program steps to effect:

providing to said phase error generator said one or more first phase error generator operating parameters;

generating said digital signal using said one or more first phase error generator operating parameters during said first portion of said time interval;

operative if said actual error correction rate is greater than said error correction rate threshold:

generating by said controller one or more second phase error generator operating parameters during said first portion of said time interval;

providing said one or more second phase error generator operating parameters to said phase error generator during said first portion of said time interval;

generating said digital signal using said one or more second phase error generator operating parameters during said second portion of said time interval.

16. The article of manufacture of claim 10, wherein said read channel comprises a PLL circuit, and wherein said controller comprises one or more first PLL circuit operating parameters, said computer readable program code further comprising a series of computer readable program steps to effect:

providing to said a PLL circuit said one or more first a PLL circuit operating parameters;

generating said digital signal using said one or more first a PLL circuit operating parameters during said first portion of said time interval;

operative if said actual error correction rate is greater than said error correction rate threshold:

generating by said controller one or more second a PLL circuit operating parameters during said first portion of said time interval;

providing said one or more second a PLL circuit operating parameters to said a PLL circuit during said first portion of said time interval;

generating said digital signal using said one or more second a PLL circuit operating parameters during said second portion of said time interval.

17. The article of manufacture of claim 10, wherein said read channel comprises a phase interpolator, and wherein said controller comprises one or more first phase interpolator operating parameters, said computer readable program code further comprising a series of computer readable program steps to effect:

provliding to said phase interpolator said one or more first phase interpolator operating parameters;

generating said digital signal using said one or more first phase interpolator operating parameters during said first portion of said time interval;

operative if said actual error correction rate is greater than said error correction rate threshold:

generating by said controller one or more second phase interpolator operating parameters during said first portion of said time interval;

providing said one or more second phase interpolator operating parameters to said phase interpolator during said first portion of said time interval;

generating said digital signal using said one or more second phase interpolator operating parameters during said second portion of said time interval.

18. The article of manufacture of claim 10, wherein said read channel comprises a maximum likelihood detector, and wherein said controller comprises one or more first maximum likelihood detector operating parameters, said computer readable program code further comprising a series of computer readable program steps to effect:

providing to said maximum likelihood detector said one or more first maximum likelihood detector operating parameters;

generating said digital signal using said one or more first maximum likelihood detector operating parameters during said first portion of said time interval;

operative if said actual error correction rate is greater than said error correction rate threshold:

generating by said controller one or more second maximum likelihood detector operating parameters during said first portion of said time interval;

providing said one or more second maximum likelihood detector operating parameters to said sample interpolator during said first portion of said time interval;

generating said digital signal using said one or more second maximum likelihood detector operating parameters during a second portion of said time interval.

* * * * *